US 6,578,036 B1

(12) United States Patent
Lu et al.

(10) Patent No.: US 6,578,036 B1
(45) Date of Patent: Jun. 10, 2003

(54) MECHANISM FOR PERFORMING POLLING IN A SYSTEM

(75) Inventors: Jarrett J. Lu, San Jose, CA (US); Nicolai Kosche, San Francisco, CA (US); Erik Nordmark, Mountain View, CA (US); Jeff Bonwick, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/571,398

(22) Filed: May 15, 2000

(51) Int. Cl.[7] .............................................. G06F 17/30
(52) U.S. Cl. ...................... 707/10; 707/104.1; 710/18; 709/224
(58) Field of Search .......................... 707/10, 100, 200, 707/101, 102, 104.1; 709/107, 318, 102, 217, 224; 714/4, 2, 3, 1; 710/5, 20, 18, 19

(56) References Cited

U.S. PATENT DOCUMENTS

| | | | | |
|---|---|---|---|---|
| 5,490,271 A | * | 2/1996 | Elliott et al. ................. 709/202 |
| 5,937,205 A | * | 8/1999 | Mattson et al. .............. 709/100 |
| 5,978,857 A | * | 11/1999 | Graham ....................... 709/312 |
| 6,047,338 A | * | 4/2000 | Grolemund .................. 709/212 |
| 6,088,816 A | * | 7/2000 | Nouri et al. ................. 709/217 |
| 6,115,741 A | * | 9/2000 | Domenikos et al. ........ 709/216 |
| 6,189,109 B1 | * | 2/2001 | Sheikh et al. ................... 714/1 |
| 6,243,838 B1 | * | 6/2001 | Liu et al. ...................... 714/43 |
| 6,279,046 B1 | * | 8/2001 | Armstrong et al. ........... 703/16 |
| 6,341,322 B1 | * | 1/2002 | Liu et al. ...................... 710/52 |
| 6,353,869 B1 | * | 3/2002 | Ofer et al. ................... 710/200 |

* cited by examiner

Primary Examiner—John Breene
Assistant Examiner—Miranda Le
(74) Attorney, Agent, or Firm—Bobby K. Truong; Hickman Palermo Truong & Becker LLP

(57) ABSTRACT

An improved mechanism for efficiently polling file descriptors in a large scale computer system is disclosed. The polling of the file descriptors is performed by first determining, based upon a set of indication information, which file descriptors are eligible for polling. A file descriptor is eligible for polling if the indication information for that file descriptor indicates that the file associated with that file descriptor might (but does not necessarily) have an event pending. Only if a file descriptor is determined to be eligible will the file descriptor and the file associated with the file descriptor be polled. By polling only the eligible file descriptors in a system, the overhead associated with the polling operation is kept to a minimum. As a result, even in a large scale system with a large number of file descriptors, polling is still performed efficiently.

24 Claims, 6 Drawing Sheets

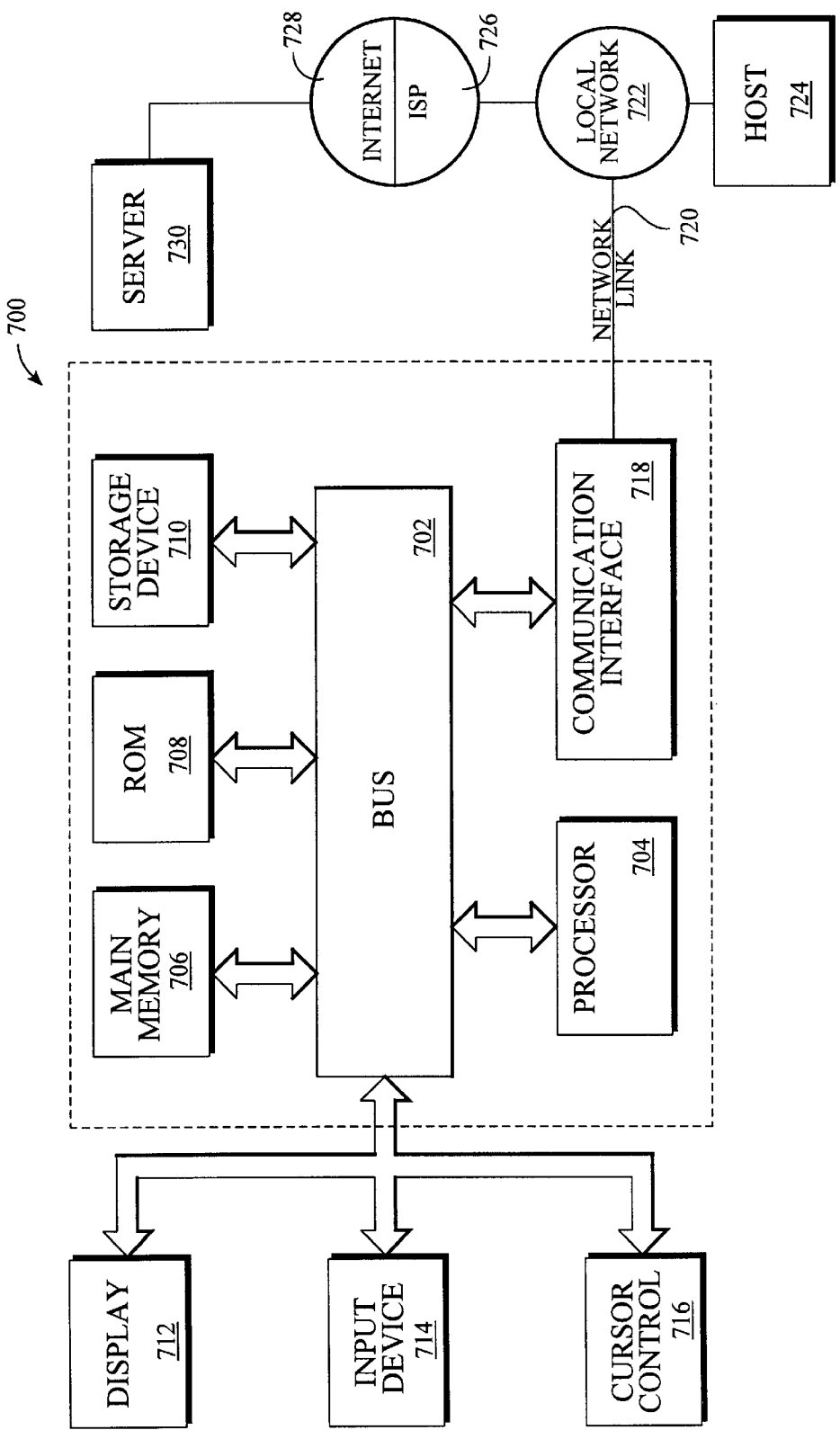

MECHANISM FOR PERFORMING POLLING IN A SYSTEM

BACKGROUND

This invention relates generally to computer systems, and more particularly to an improved mechanism for performing polling in a computer system.

Many operating systems (e.g. UNIX) use the notion of a "file" to access system resources. Used in this context, the term "file" refers broadly to anything that can be accessed via a path name, an IP address, or some other designator. Under this definition, a file may be, but is not limited to, a device (e.g. an I/O device), a collection of records, or a network node. To facilitate access to a file, the operating system generates a file descriptor (Fd) whenever a file is opened. This file descriptor is associated with the file, and is thereafter used as a handle to access the file. In some implementations, the file descriptor takes the form of an integer. This integer serves as an index into an entry of a file descriptor table. This entry contains a pointer to a structure within a group of one or more structures that contain pointers that eventually point to the file. By starting with the file descriptor and then following the various pointers, the file is eventually accessed.

A typical setup used to access files is shown in FIG. 1, wherein the setup comprises a file descriptor table 102 containing a plurality of entries 104. Each entry 104 is referenced using an index, and each entry 104 contains a pointer to a structure within a group of one or more structures 106. These structures 106 contain pointers that eventually point to the files 108 themselves. As noted above, the Fd is an integer, and it serves as an index into a particular entry of the file descriptor table 102. If the value of the Fd is "0", for example, then it references the first entry 104(0) in the file descriptor table 102. Likewise, if the value of the Fd is "1", then it references the second entry 104(1), and so on. Given that the Fd acts as an index into a particular entry 104 of the file descriptor table 102, and that the particular entry 104 contains a pointer which eventually leads to a particular file 108, it follows that the Fd acts as a handle to a particular file. In the example shown in FIG. 1, Fd "0" is the handle to file A 108(a), Fd "1" is the handle to File B 108(b), and Fd "2" is the handle to file C 108(c).

During program execution, it is often necessary to poll various file descriptors to determine whether the files 108 associated with those file descriptors have any events that need to be serviced. This process of polling file descriptors is currently carried out by systematically polling each and every Fd for which polling is desired. More specifically, for each desired Fd, an associated entry 104 in the file descriptor table 102 is referenced. The pointer in the entry 104 is then followed to the structure(s) 106, and the pointers in the structure(s) 106 are followed to the file 108. Once the file 108 is accessed, it is polled for events. This process is repeated for each and every Fd for which polling is desired. At the end of the polling process, a list of Fd's and associated events is derived.

With relatively few Fd's in a system, this polling approach achieves satisfactory results. This is because the time required to poll a small number of file descriptors is fairly negligible. However, when the number of file descriptors becomes large, as is the case in complex computing systems, the polling of Fd's can require a significant amount of time and resources. In fact, if polling is performed on a repeated basis (as is the case in many programs), the polling operation alone can significantly degrade system performance. Because the current approach has a tendency to require a large number of Fd's to be indiscriminately polled whenever a polling operation is performed, it cannot be applied to large scale systems (i.e. it is not scalable). As a result, an improved mechanism is needed to perform polling in a large scale system.

SUMMARY OF THE INVENTION

In light of the shortcomings of the prior art, the present invention provides an improved mechanism for performing polling efficiently in a large scale computer system. The present invention is based, at least partially, upon the observation that when a polling operation is performed, it is not necessary to poll each and every Fd for which polling is desired. Rather, only those Fd's (referred to herein as eligible Fd's) that are associated with files for which there might be an event pending need to be polled. It has been found that the number of eligible Fd's in a system remains relatively small even when the total number of Fd's is quite large. Thus, by polling only eligible Fd's, the present invention keeps the overhead associated with a polling operation to a minimum. As a result, even in a large scale system with a large number of Fd's, polling can still be performed efficiently.

To enable only eligible Fd's to be polled, there is maintained a set of indication information. This indication information specifies for each Fd whether the file associated with that Fd might have an event pending. In one embodiment, the set of indication information takes the form of a bitmap. Each bit of the bitmap is associated with a particular Fd, and each bit indicates one of two possibilities: (1) that the file associated with the Fd has no event pending; or (2) that the file associated with the Fd might (but does not necessarily) have an event pending. Based upon the bitmap, it can be quickly and easily determined which Fd's do not need to be polled and which Fd's are eligible for polling, so that when it comes time to perform the polling operation, only the eligible Fd's are polled. This eliminates the unnecessary polling of many Fd's, which in turn significantly improves the overall efficiency of the polling process. Thus, the present invention makes it possible to efficiently implement polling even in a large scale system.

BRIEF DESCRIPTION OF THE DRAWINGS

FIG. 7 is a hardware block diagram of a computer system in which the present invention may be implemented.

DETAILED DESCRIPTION OF EMBODIMENTS

Figure 2:
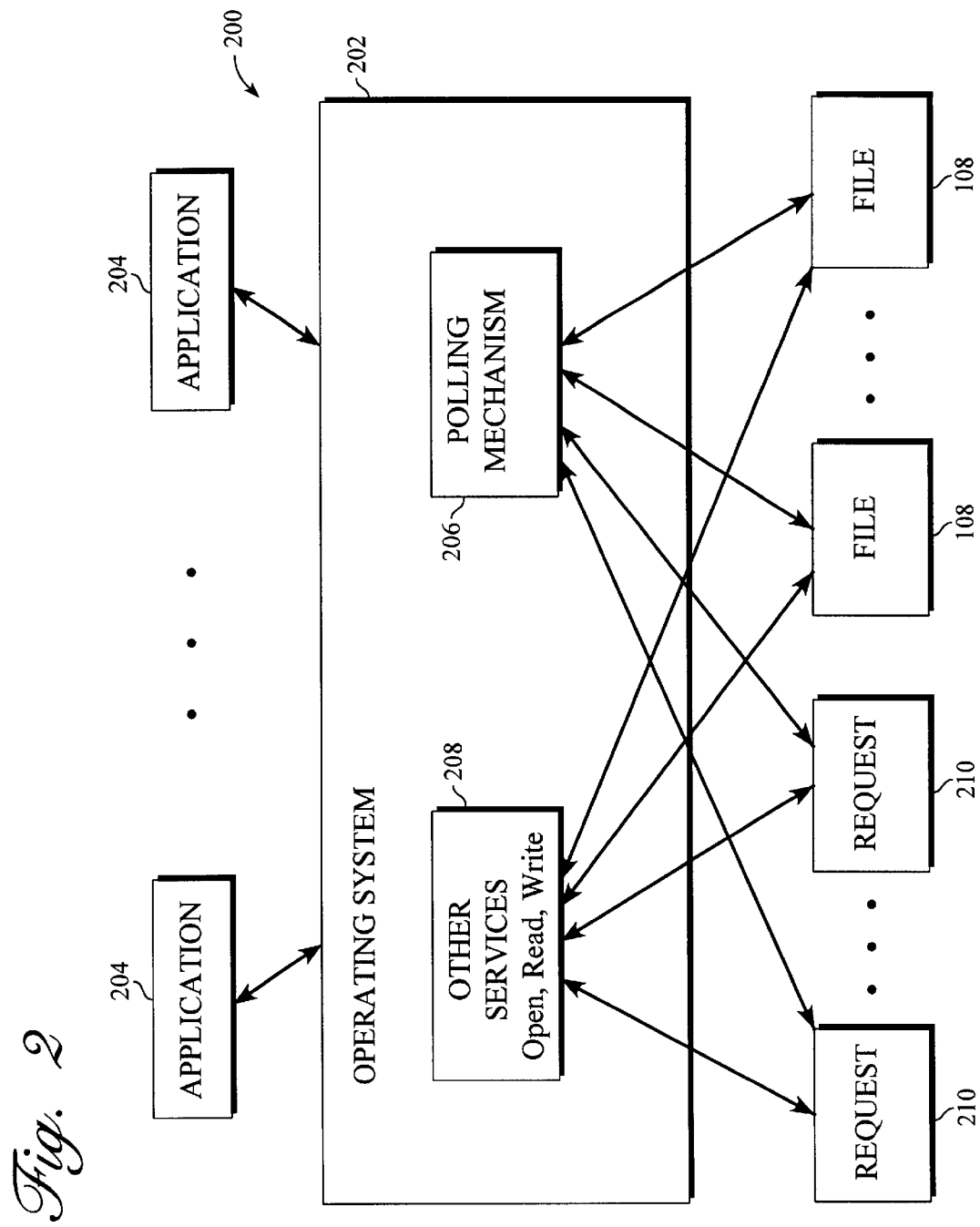
FIG. 2 is a functional block diagram of a system in which one embodiment of the present invention may be implemented.

With reference to FIG. 2, there is shown a functional block diagram of a system 200 in which one embodiment of the present invention may be implemented, the system 200 comprising an operating system 202, one or more applications 204, and one or more files 108. For purposes of the present invention, the applications 204 may be any type of program written in any language capable of any desired functionality, and the files 108 may be any system resource capable of being accessed via a path name, an IP address, or some other designator. Files 108 may include but not limited to devices (such as I/O devices), collections of records, and network nodes.

During execution, the applications 204 invoke low level services provided by the operating system 202. These services include the polling mechanism 206 of the present invention for polling files 108 for events, and other services 208. These other services 208 include services for opening, reading from, and writing to files 108. For purposes of the present invention, the operating system 202 may be any type of operating system (e.g. UNIX), and may be single-threaded or multi-threaded.

Figure 1:
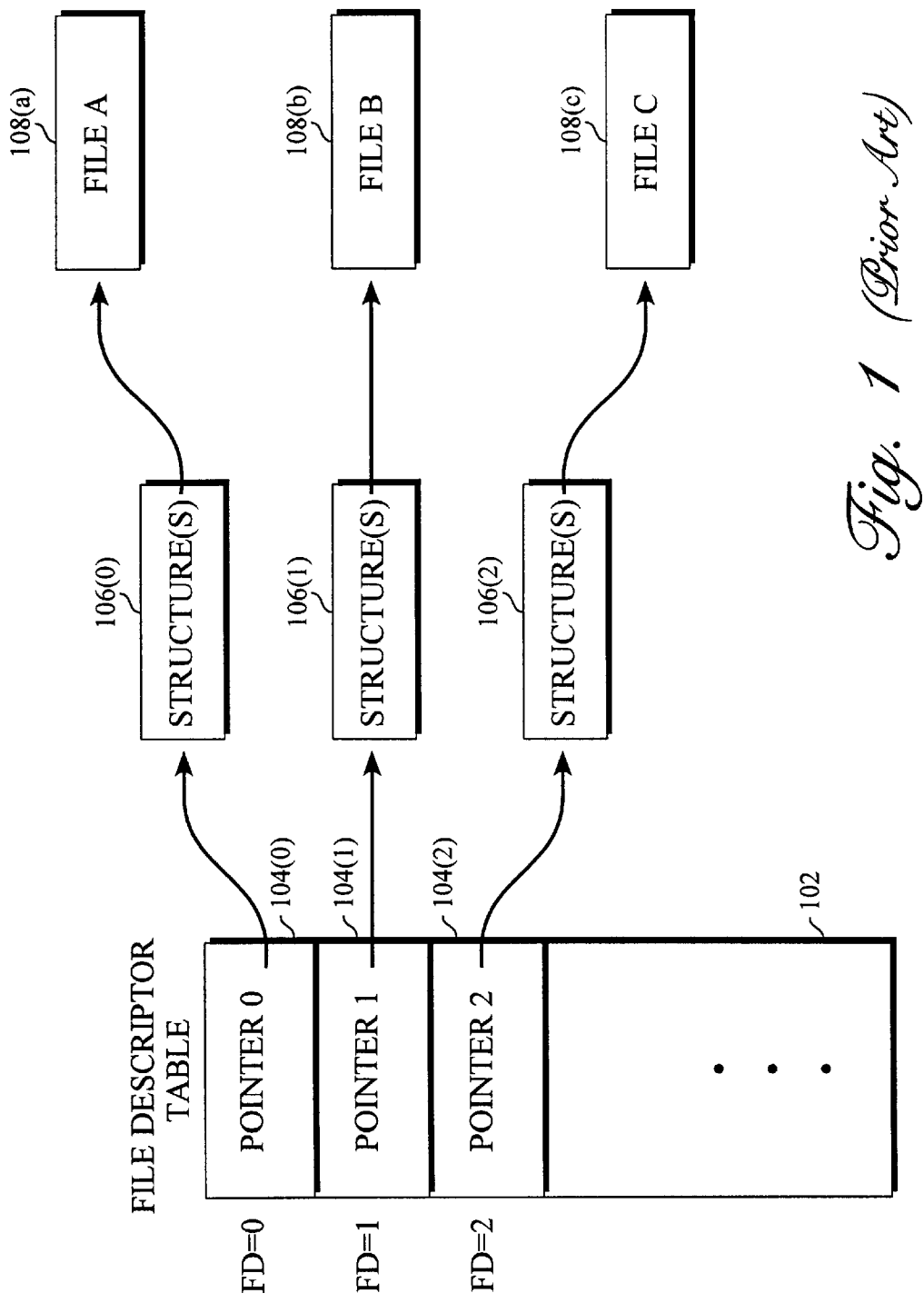
FIG. 1 is a functional diagram illustrating the manner in which files are currently accessed using file descriptors.

In one embodiment, the operating system 202 accesses files 108 in the same manner as that described in connection with FIG. 1. Namely, each time a file 108 is opened, an Fd is generated and associated with that file 108. That Fd is thereafter used as a handle to access the file 108. In one embodiment, the Fd takes the form of an integer, and this integer serves as an index into an entry of the file descriptor table 102 maintained by the operating system 202. This entry 104 contains a pointer to a structure within a group of one or more structures 106. These structures 106 in turn contain pointers that eventually lead to the file 108. By using the Fd to access an appropriate entry 104 in the file descriptor table 102, and then following the pointers in the entry 104 and the structures 106, the file 108 is eventually accessed. In this manner, the Fd is used as a handle to access a file 108.

As noted above, it is the operating system 202 that maintains the file descriptor table 102. In one embodiment, the table 102 is maintained on a "per process" basis. That is, all of the Fd's associated with a particular execution process are maintained in the same file descriptor table 102. If the operating system is muti-threaded, the file descriptor table 102 may contain Fd's accessible by multiple threads. Since a file may be opened multiple times, multiple Fd's may refer to the same file 108.

During execution, the applications 204 invoke the polling mechanism 206 to poll one or more Fd's. In response to these invocations, the polling mechanism 206 carries out the polling methodology of the present invention. Namely, the polling mechanism 206 determines which Fd's (referred to herein as eligible Fd's) are associated with files 108 which may have events pending, and then polls only those eligible Fd's. By polling only eligible Fd's, the polling mechanism 206 keeps the polling overhead to a minimum. Hence, the polling of a large number of Fd's in a complex system is performed efficiently.

Figure 3:
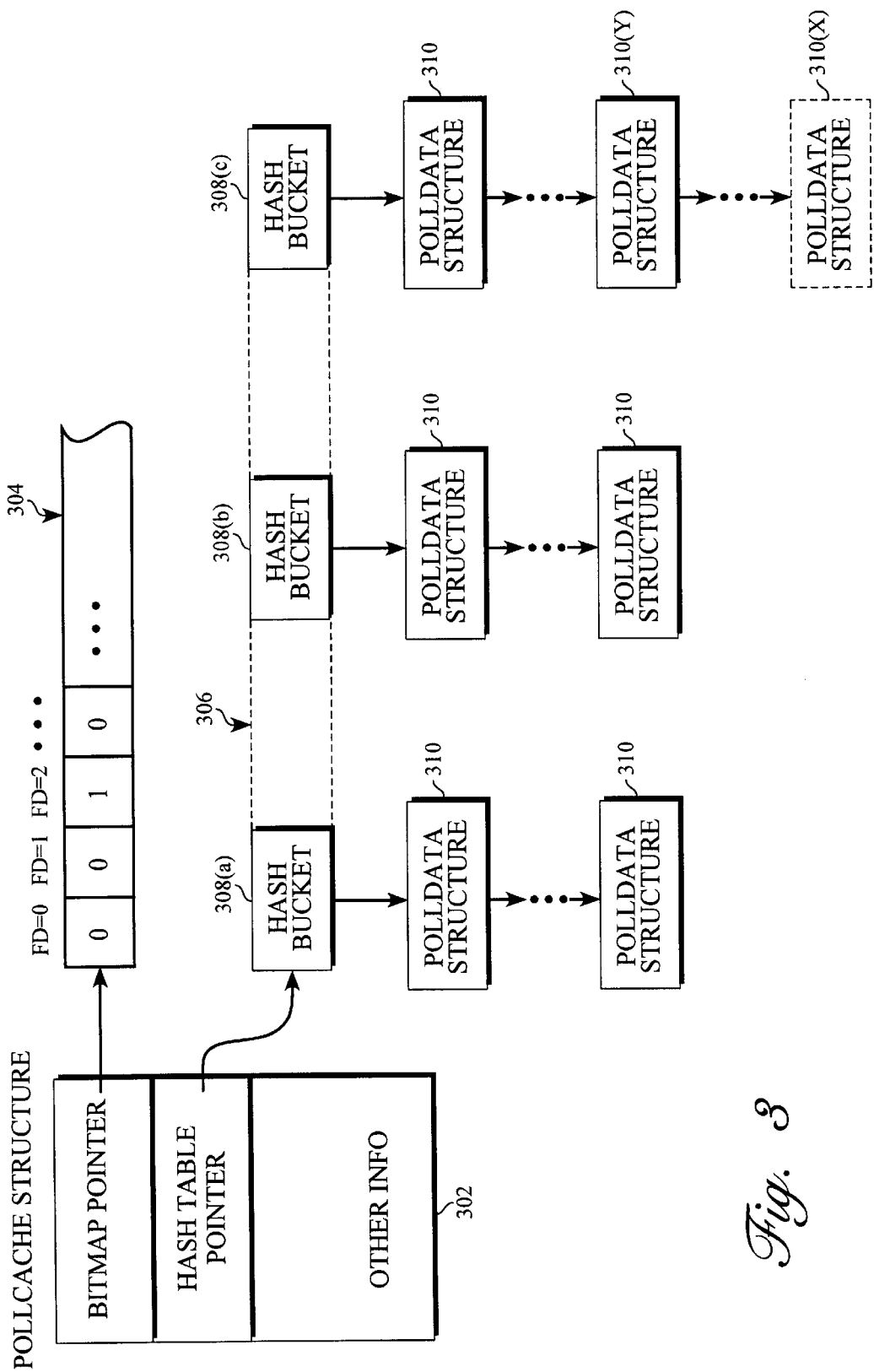
FIG. 3 is a functional block diagram of the data structures used in one embodiment to carry out the polling methodology of the present invention.

In carrying out its polling function, the polling mechanism 206 refers to and manipulates a number of data structures. These data structures are shown in FIG. 3, including a pollcache structure 302, a bitmap 304, a plurality of polldata structures 310, and a hash table 306 for facilitating access to the polldata structures 310. The pollcache structure 302 serves as the starting point for accessing the other structures. In this regard, it contains a bitmap pointer for providing a reference to the bitmap 304, and a hash table pointer for providing a link to the hash table 306. In addition to these two pointers, the pollcache structure 302 may further include other information which may be used by the polling mechanism 302, such as locks and conditional variables. In one embodiment, there is one pollcache structure 302 per thread.

The bitmap 304 is the data structure that provides the polling mechanism 206 with the indication information that it needs to determine whether a file associated with an Fd might have an event pending. For each Fd that has been or is currently being polled, there is an associated bit in the bitmap 304. Which bit is associated with a particular Fd is determined by the value of the Fd. For example, the bit associated with Fd "0" is the first bit, the bit associate with Fd "1" is the second bit, and so on. This association scheme makes it easy to determine, based solely upon the value of the Fd, which bit of the bitmap 304 is associated with that particular Fd.

The value of a bit in the bitmap 304 indicates whether the file associated with a particular Fd might have an event pending. In one embodiment, if the value of the bit is "1", then the file might have an event pending. If the value of the bit is "0", then the file does not have an event pending. Note that the bit indicates a probability, not a certainty, that an event is pending in the file. It is possible that an event was pending at one time but that it has already been consumed, and hence, is no longer pending. Despite the possibility of being outdated, the bit nonetheless provides useful information for determining which Fd's to poll for events. Initially, each bit in the bitmap 304 corresponding to a new Fd is set to "1". This causes each new Fd to be polled the first time that Fd is marked for polling. When a new Fd is polled, if no events are returned, then the bit in the bitmap 304 corresponding to that new Fd is reset to "0". As events occur in the various files 108, the bits in the bitmap 304 are updated to indicate pending events. The process of updating the bits in the bitmap 304 is described in a later section. In one embodiment, there is one bitmap 304 per thread.

Figure 4:
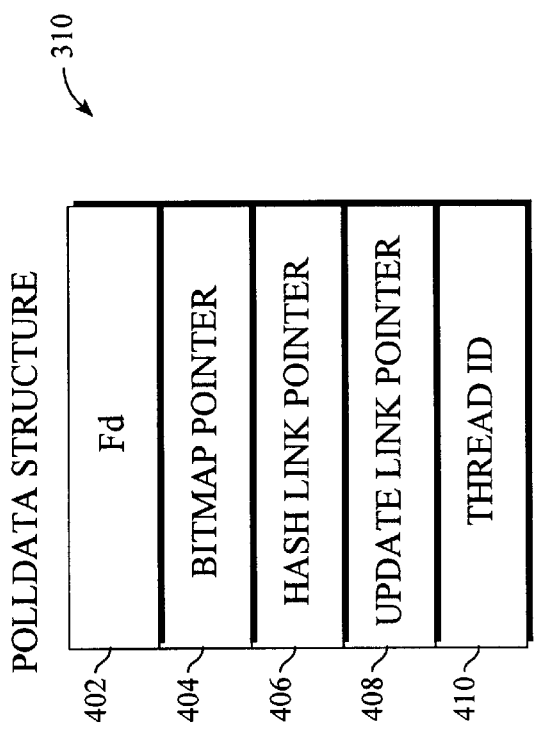
FIG. 4 is a block diagram of one embodiment of the polldata structure of FIG. 3.

For each Fd that has previously been polled, there is an associated polldata structure 310. This structure 310 is created the first time an Fd is polled, and it is registered into the overall system for subsequent use and manipulation. The polldata structure 310 contains all of the information needed to facilitate access to and manipulation of the various data structures in the system. A block diagram of one embodiment of the polldata structure 310 is shown in FIG. 4. As shown, the polldata structure 310 comprises various sets of information, including an Fd 402, a bitmap pointer 404, a hash link pointer 406, an update link pointer 408, and a thread ID 410. The Fd 402 contains the value of the Fd with which a particular polldata structure 310 is associated. The bitmap pointer 404 provides a reference to the bitmap 304 associated with that particular Fd. The hash link pointer 406 points to the polldata structure 310 that is next on a particular hash list (as will be explained further below). The update link pointer 408 points to the next polldata structure 310 that is associated with an Fd that needs to be updated by a file (as will be discussed below), and the thread ID 410 contains the ID of the thread with which the Fd is associated. As will be explained below, these information sets 402–410 are used by the polling mechanism 206 and the files 108 themselves to carry out the methodology of the present invention.

Returning to FIG. 3, to facilitate access to the polldata structures 310, there is maintained a hash table 306 comprising a plurality of hash buckets 308. Each hash bucket 308 contains a pointer which leads to zero or more polldata structures 310. The polldata structures 310 within a hash bucket are linked together using the hash link pointer 406 of each polldata structure 310. More specifically, the hash link pointer 406 of each polldata structure 310 points to the next polldata structure 310 on the hash list. In this manner, the polldata structures 310 within a hash bucket are linked together in a single linked-list fashion. In which hash bucket 308 a particular polldata structure 310 belongs depends upon the Fd associated with that polldata structure 310. Namely, the Fd associated with a polldata structure 310 is hashed using a hashing algorithm (any desired algorithm may be used for purposes of the present invention) to determine the hash bucket 308 in which the polldata structure 310 belongs. By arranging the polldata structures 310 in this manner, access to the structures 310 is simplified and accelerated.

As mentioned above, the polling mechanism 206 uses the bitmap 304 to determine which Fd's have potentially pending events, and hence, which Fd's to poll. In order for this determination to be correct, the bitmap 304 needs to contain correct information. In one embodiment, to maintain the bitmap 304 in a current state, the bitmap 304 is updated whenever a file associated with a particular Fd experiences an event. More specifically, when a file associated with a particular Fd experiences an event, the bit in the bitmap 304 associated with that particular Fd is set to "1". That way, the next time the polling mechanism 206 is invoked, it will poll that particular Fd. In one embodiment, the task of updating the bitmap 304 in response to events is delegated to the files 108 themselves.

Figure 5:
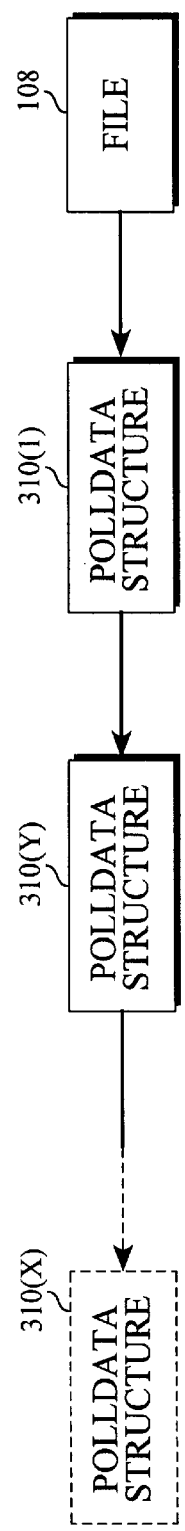
FIG. 5 is a functional block diagram illustrating the manner in which a file updates the bitmaps of associated file descriptors.

As shown in FIG. 5, each file 108 has associated with it a list of polldata structures 310. These structures 310 correspond to the Fd's with which the file 108 is associated, and these structures 310 are added to the list when the Fd's associated with the file 108 are polled for the first time. When the file 108 experiences an event, it traverses the update list, and updates, using the information contained in each of the polldata structures 310, the bitmaps 304 associated with the structures 310. By doing so, the file 108 keeps the bitmap 304 current, thereby, enabling the polling mechanism 206 to operate properly. To illustrate how the update process proceeds, suppose that file 108 experiences an event. In such a case, the file 108 accesses the first polldata structure 310(1) on the update list. From this structure 310(1), the file 108 extracts a bitmap pointer 404 (FIG. 4) and a Fd. Using the bitmap pointer 404, it access the bitmap 304. Using the Fd, it updates the proper bit in the bitmap 304 to "1". Once that is done, a pending event is indicated by the proper bit in the bitmap; thus, the next time the polling mechanism 206 performs a poll, it will poll the Fd associated with the file 108, and hence, the file 108 itself for events. The bitmap 204 is thus updated.

Thereafter, the file 108 continues on to the next polldata structure 310(y). In one embodiment, the file 108 uses the update link pointer 408 of structure 310(1) to get to structure 310(y). Once structure 310(y) is accessed, the file 108 repeats the above process. Namely, it extracts a bitmap pointer 404 and a Fd from the structure 310(y). Then, using the bitmap pointer 404, it access the bitmap 304, and using the Fd, it updates the proper bit in the bitmap 304 to "1". Once that is done, the bitmap 204 is updated, and the file 108 proceeds to the next polldata structure 310(x). This continues until all of the polldata structures 310 on the update list are updated. At this point, it should be noted that the polldata structures 310 on the update list need not all correspond to the same thread or even to the same process. Rather, structures from different threads and processes may appear on the update list. This is within the scope of the present invention.

Figure 6:
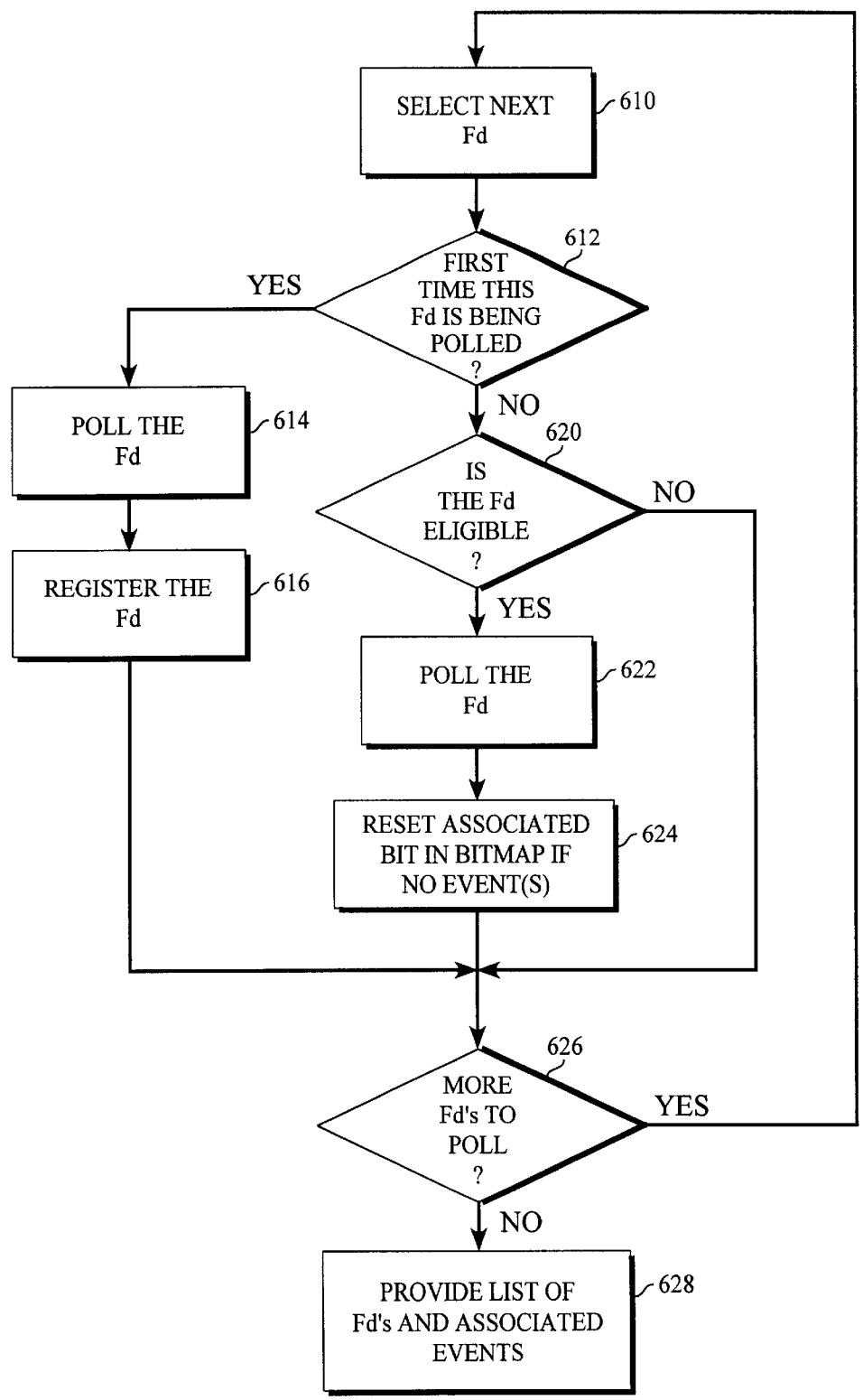
FIG. 6 is an operational flow diagram for the polling mechanism of the present invention.

The structure of the present invention has been disclosed. With reference to the flow diagram of FIG. 6, the operation of the polling mechanism 206 will now be described. Initially, the polling mechanism 206 receives a request from an application 204 to poll one or more Fd's. In response to this request, the polling mechanism 206 selects (610) the next Fd to process (in this case, it will be the first Fd to process). Once an Fd is selected, the polling mechanism 206 determines (612) whether this is the first time the Fd is being polled. In one embodiment, this determination is made by referencing the hash table 306 (FIG. 3) using the hash table pointer in the pollcache structure 302. More specifically, the Fd is hashed to get to one of the hash buckets 308. Then, the list of polldata structures 310 within that hash bucket is traversed to search for a polldata structure 310 having the particular Fd. If no such polldata structure 310 is found, then it means that the Fd has not been polled before.

In such a case, the polling mechanism 206 polls (614) the Fd. This is done by first using the Fd to access a particular entry in the file descriptor table 102 (FIG. 1). Then, the pointer in the entry is followed to the structure(s) 106, and the pointers in the structure(s) 106 are followed to the file 108. Once the file 108 is accessed, it is polled for events. If the poll returns no events, then the bit in the bitmap 304 associated with the Fd is reset to "0". If one or more events are returned, then the bit is maintained at "1". The Fd and the associated file 108 are thus polled.

In addition to polling the new Fd, the polling mechanism 206 also registers it. In registering (616) the new Fd, the polling mechanism performs several tasks. First, it creates a new polldata structure 310 for the Fd. This new structure is populated with the proper values for the Fd, the bitmap pointer (derived from the bitmap pointer of the pollcache structure 302), and the thread ID. The new structure is then added to the proper hash link list and the proper update list. To illustrate, suppose that the new Fd hashes to hash bucket 308(c) (FIG. 3). In such a case, the new polldata structure 310(x) is added to the hash list by updating the hash link pointer of the previous polldata structure 310(y) to point to the new structure 310(x). The new structure is added to the update list of the proper file 108 in a similar manner. Namely, the update link pointer of the previous polldata structure 310(y) (FIG. 5) is updated to point to the new structure 310(x). The new polldata structure 310(x) associated with the new Fd is thus registered. With that done, the polling mechanism 206 proceeds to (626).

Returning to (612), if the polling mechanism 206 finds a polldata structure 310 associated with the Fd, then it knows that this is not the first time the Fd is being polled. In such a case, the polling mechanism 206 proceeds to (620) to determine whether the Fd is eligible for polling. This determination is made by consulting the appropriate bit in the appropriate bitmap 304 (using the bitmap pointer of the polldata structure 310). More specifically, using the bitmap pointer, the polling mechanism 206 accesses the appropriate bitmap 304. Then, using the Fd, the polling mechanism 206 accesses the appropriate bit. If that bit has a value of "0", thereby indicating that the file associated with the Fd does not have an event pending, then the Fd is not polled, and the polling mechanism 206 proceeds to (626). On the other hand, if the bit has a value of "1", thereby indicating that the file associated with the Fd might have an event pending, then the polling mechanism 206 polls (622) the Fd. This is done in the same manner as that described above in connection with (614).

Once that is done, the polling mechanism 206 determines whether any events were returned as a result of the poll. If one or more events were returned, then the polling mechanism 206 maintains the bit in the bitmap at "1". On the other hand, if no events were returned, then the polling mechanism 206 resets (624) the bit in the bitmap 304 to "0". This bit in the bitmap 304 may also be reset if the associated Fd is closed or is no longer being polled. Thereafter, the polling mechanism 206 proceeds to (626) to determine whether there are any more Fd's to process. If so, then it loops back to (610) to process another Fd. If not, then it proceeds to (628) to provide a list of Fd's and associated events. The polling operation is thus completed.

Thus far, the invention has been described with reference to files and file descriptors. However, it should be noted that the invention is not so limited. Rather, it may be applied to many other implementations in which polling or polling-like operations are needed. One example is in the asynchronous input/output (I/O) arena.

With asynchronous I/O, I/O requests 210 (FIG. 2) are submitted to the operating system 202 for processing. These requests 210 may be submitted, for example, by an application 204. Once the requests 210 are submitted, the application 204 is free to perform other tasks. At some point, the application 204 may wish to ascertain the status of the requests 210 that it submitted. To obtain a status update, the application 210 submits an update request to the operating system 202 with a list of requests 210 for which it wishes to obtain a status update. In response to this update request, the operating system 202 determines, for each request 210 on the list, whether there are one or more events associated with that request 210. This determination is done in a polling-like fashion. That is, each request 210 is examined in turn to determine whether it has events associated therewith. To improve the efficiency of this polling-like operation, the polling mechanism 206 and the polling methodology of the present invention may be used. Namely, like the Fd's described above, each request 210 may have associated with it a set of indication information (e.g. a bit in a bitmap) which indicates whether there is a probability that that request 210 has a pending event. This indication information may be used to determine whether each request 210 should be examined or polled. More specifically, if the indication information indicates that there is a probability that a request 210 has an event associated therewith, then that request 210 is polled. Otherwise, that request 210 is not polled. By polling only those requests 210 that might have events associated therewith, the present invention significantly improves the efficiency of the polling process.

As this discussion shows, the present invention may be utilized to poll requests as well as file descriptors. Overall, the present invention may be used advantageously, to poll any type of entity. Files, file descriptors, and requests are just some examples of these entities. There are many others. All possible entities are within the scope of the present invention.

Hardware Overview

In one embodiment, the polling mechanism 206 of the present invention is implemented as a set of instructions executable by one or more processors. The invention may be implemented as part of an object oriented programming system, including but not limited to the Solaris™ operating system manufactured by Sun Microsystems, Inc. of Mountain View, Calif. FIG. 7 shows a hardware block diagram of a computer system 700 in which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 may also be further used to store temporary variables or other intermediate information during execution of instructions by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

According to one embodiment, the functionality of the present invention is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or electromagnetic waves, such, as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for polling entities in a system, comprising:

accessing a set of indication information pertaining to a set of one or more entities, said indication information indicating which entities in said set of entities potentially have one or more events pending;

determining, based upon said indication information, which entities in said set of entities are eligible for polling, wherein a entity is eligible for polling if it potentially has one or more events pending; and polling only those entities which are determined to be eligible for polling.

2. The method of claim 1, wherein said indication information comprises a bitmap.

3. The method of claim 2, wherein said bitmap comprises a bit corresponding to each entity in said set of entities, and wherein each bit indicates whether its corresponding entity potentially has one or more events pending.

4. The method of claim 1, wherein said indication information is updated whenever one or more of said entities in said set of entities experiences an event.

5. The method of claim 4, wherein said set of one or more entities comprises one or more files.

6. The method of claim 5, wherein said indication information is updated by one or more of said files.

7. The method of claim 6, further comprising:

registering one or more data structures with one or more of said files to enable said files to update said indication information, wherein said one or more data structures comprise information for referencing said indication information.

8. The method of claim 4, wherein said set of one or more entities comprises one or more requests.

9. An apparatus for polling entities in a computer system, comprising:

a storage for storing a set of indication information pertaining to a set of one or more entities, said indication information indicating which entities in said set of entities potentially have one or more events pending;

a mechanism for accessing said indication information;

a mechanism for determining, based upon said indication information, which entities in said set of entities are eligible for polling, wherein a entity is eligible for polling if it potentially has one or more events pending; and a mechanism for polling only those entities which are determined to be eligible for polling.

10. The apparatus of claim 9, wherein said indication information comprises a bitmap.

11. The apparatus of claim 10, wherein said bitmap comprises a bit corresponding to each entity in said set of entities, and wherein each bit indicates whether its corresponding entity potentially has one or more events pending.

12. The apparatus of claim 9, wherein said indication information is updated whenever one or more of said entities in said set of entities experiences an event.

13. The apparatus of claim 12, wherein said set of one or more entities comprises one or more files.

14. The apparatus of claim 13, wherein said indication information is updated by one or more of said files.

15. The apparatus of claim 14, further comprising:

a mechanism for registering one or more data structures with one or more of said files to enable said files to update said indication information, wherein said one or more data structures comprise information for referencing said indication information.

16. The apparatus of claim 12, wherein said set of one or more entities comprises one or more requests.

17. A computer readable medium having stored thereon instructions which, when executed by one or more processors, cause the one or more processors to poll entities in a system, said computer readable medium comprising:

instructions for causing one or more processors to access a set of indication information pertaining to a set of one or more entities, said indication information indicating which entities in said set of entities potentially have one or more events pending;

instructions for causing one or more processors to determine, based upon said indication information, which entities in said set of entities are eligible for polling, wherein a entity is eligible for polling if it potentially has one or more events pending; and instructions for causing one or more processors to poll only those entities which are determined to be eligible for polling.

18. The computer readable medium of claim 17, wherein said indication information comprises a bitmap.

19. The computer readable medium of claim 18, wherein said bitmap comprises a bit corresponding to each entity in said set of entities, and wherein each bit indicates whether its corresponding entity potentially has one or more events pending.

20. The computer readable medium of claim 17, wherein said indication information is updated whenever one or more of said entities in said set of entities experiences an event.

21. The computer readable medium of claim 20, wherein said set of one or more entities comprises one or more files.

22. The computer readable medium of claim 21, wherein said indication information is updated by one or more of said files.

23. The computer readable medium of claim 22, further comprising:

instructions for causing one or more processors to register one or more data structures with one or more of said files to enable said files to update said indication information, wherein said one or more data structures comprise information for referencing said indication information.

24. The computer readable medium of claim 20, wherein said set of one or more entities comprises one or more requests.

* * * * *

UNITED STATES PATENT AND TRADEMARK OFFICE
CERTIFICATE OF CORRECTION

PATENT NO. : 6,578,036 B1
DATED : June 10, 2003
INVENTOR(S) : Lu et al.

It is certified that error appears in the above-identified patent and that said Letters Patent is hereby corrected as shown below:

Title page,
Item [54], please replace the title with -- IMPROVED MECHANISM FOR PERFORMING POLLING IN A SYSTEM --

Signed and Sealed this

Fourteenth Day of October, 2003

JAMES E. ROGAN
*Director of the United States Patent and Trademark Office*